April 6, 1926. 1,579,545
A. S. LANGSDORF
AUTOMATIC CONTROL FOR POWER CONVEYER SYSTEMS
Filed Jan. 7, 1925  2 Sheets-Sheet 1
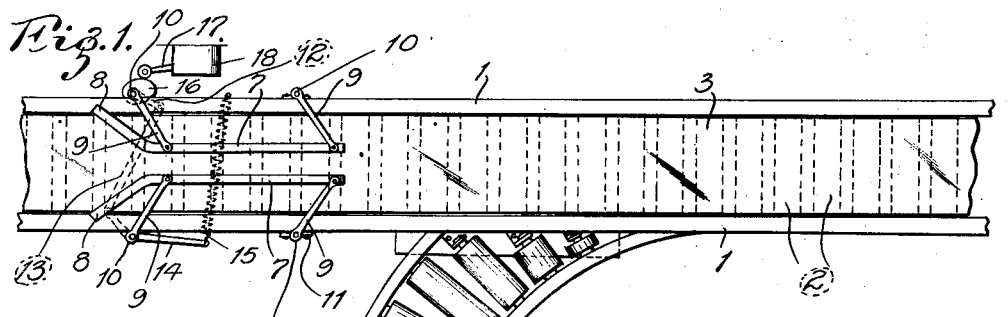
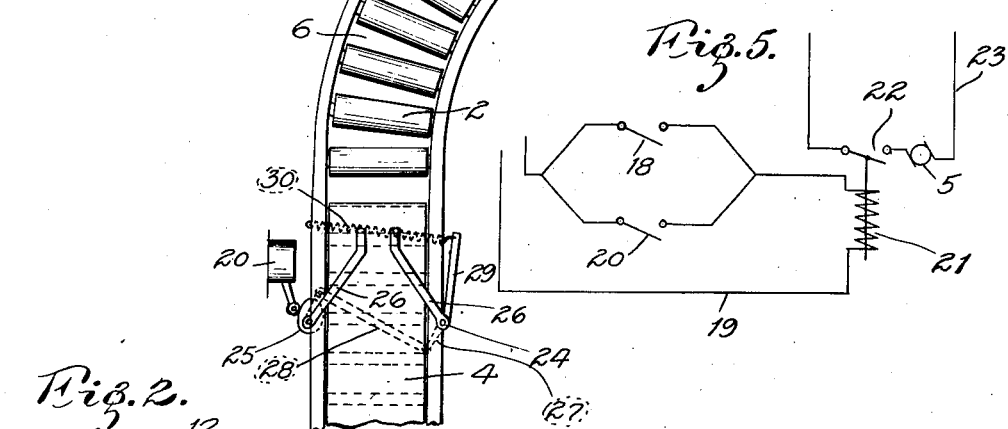
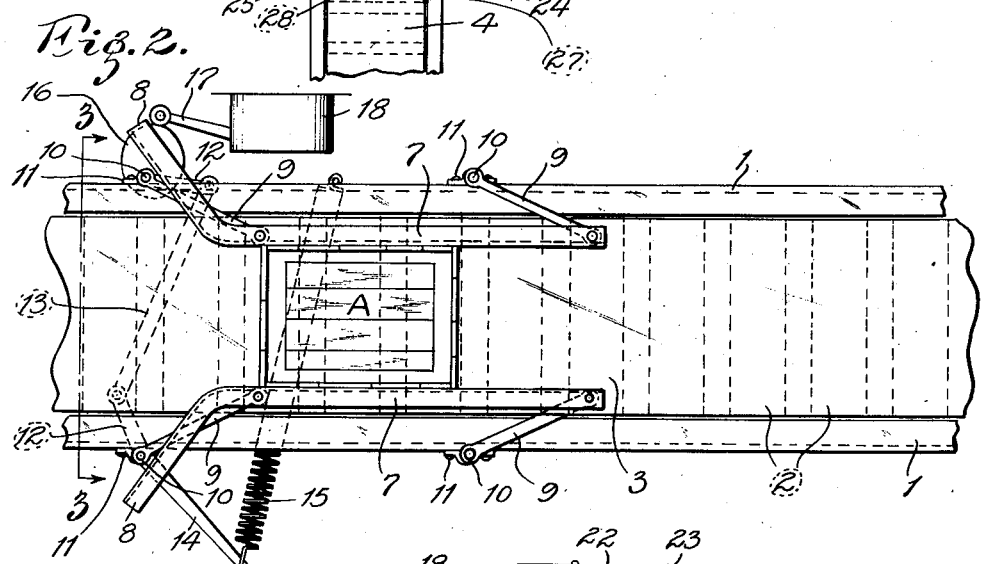
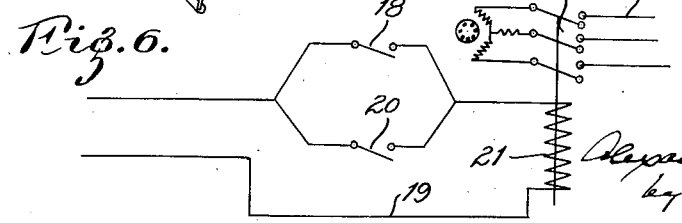
INVENTOR:-
Alexander S. Langsdorf
by
HIS ATTORNEYS.

April 6, 1926.  1,579,545
A. S. LANGSDORF
AUTOMATIC CONTROL FOR POWER CONVEYER SYSTEMS
Filed Jan. 7, 1925   2 Sheets-Sheet 2

INVENTOR:
Alexander S. Langsdorf,
by
HIS ATTORNEYS.

Patented Apr. 6, 1926.

1,579,545

UNITED STATES PATENT OFFICE.

ALEXANDER S. LANGSDORF, OF ST. LOUIS, MISSOURI, ASSIGNOR TO ALVEY MANUFACTURING COMPANY, OF ST. LOUIS, MISSOURI, A CORPORATION OF MISSOURI

AUTOMATIC CONTROL FOR POWER CONVEYER SYSTEMS.

Application filed January 7, 1925. Serial No. 1,107.

*To all whom it may concern:*

Be it known that I, ALEXANDER S. LANGSDORF, a citizen of the United States, and a resident of the city of St. Louis and State of Missouri, have invented a new and useful Improvement in Automatic Controls for Power Conveyer Systems, of which the following is a specification.

There is a type of power conveyer system wherein branch conveyers deliver articles to a main conveyer. With systems of this type, there are likely to be frequent collisions at the points where the branch lines meet the main line; and the principal object of the present invention is to avoid such collisions by regulating the distribution of the articles. The invention consists principally in providing the main line and the branch lines with controlling devices that are adapted to be operated by the articles approaching the meeting point of two systems and themselves arranged to control the power mechanism. The invention also consists in the parts and in the arrangements and combinations of parts hereinafter described and claimed.

In the accompanying drawing which forms part of this specification and wherein like numerals refer to like parts wherever they occur—

Fig. 1 is a plan view of a portion of a power conveyer system embodying my invention adjacent to the meeting point of a main line and a branch line.

Fig. 2 is an enlarged view of a gate-way portion of the main line;

Fig. 5 is a diagram of the wiring system used with a commutator motor 5 such as is used in direct-current circuits; and Fig. 6 is a diagram of the wiring system used with an alternating current motor 5ª, a three-phase circuit being indicated, though a circuit having a different number of phases may be used.

Figure 3:
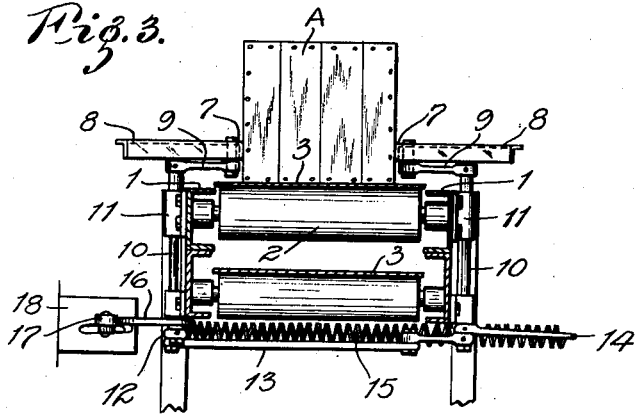
Fig. 3 is a vertical cross-sectional view of the main line on the line 3—3 of Fig. 2.

The main line power conveyer is of any suitable type. The construction illustrated in the drawing comprises side frames 1, rollers 2 rotatably mounted on said frames and an endless belt 3 supported by said rollers and actuated by a suitable source of power, such, for instance, as an electric motor (not shown). The branch line is likewise of ordinary type, that illustrated in the drawing being similar to the main line conveyer and the belt 4 thereof being actuated by a separate electric motor 5 or other suitable source of power. In accordance with known practice, a short section of gravity conveyer 6, preferably a roller-way, is interposed between the end of the branch line and the main line, this gravity conveyer section being curved to change the direction of travel of the articles so as to start them in the proper direction and in the proper position on the main line.

Located crosswise of the main line a short distance rearwardly from the junction of said branch line therewith, is a mechanism which functions as a gate-way and also as a device for controlling a power mechanism. This gate-way comprises two bars 7 with elongated straight portions parallel with the side frames of the main line conveyer and with their rear end portions 8 inclined outwardly and rearwardly. These elongated bars are disposed opposite each other and, in their closed position, which is their normal position, they are closer together than the width of articles A handled on the power conveyer. Each of these elongated bars is pivotally mounted on two or more parallel rock arms 9 of equal length, the shafts 10 of said rock arms being vertically disposed in suitable brackets 11 provided therefore on the respective side frames. Two opposite vertical shafts are provided with radially extending arms 12 which, in turn, are pivotally connected together by a link 13 underneath the conveyer. One or more of said vertical rock shafts is provided with an arm 14 to which is attached a helical spring 15 suitably anchored to the framework of the conveyer. By this arrangement, the side bars have a parallel motion; that is, said side bars, being mounted on parallel links of even length, maintain their parallel relation with each other whatever may be the space between them. Likewise, the movement of one of said side bars is transmitted to and causes simultaneous movement of the other bar.

Mounted on one of the vertical rock shafts 10 is an eccentric or cam 16; and cooperating with said eccentric or cam, so as to be actuated thereby, is the arm 17 of a limit switch 18 in the control circuit 19 of the branch line motor 5. In the normal position of the parts, corresponding to the closed position of the gate-way, this main line switch is closed; and when the gate-way is opened, the concomitant movement of the cam operates the lever arm of said limit switch to open the same.

The branch line is also equipped with a control gate-way mechanism hereinafter described and with a limit switch 20 in the circuit of the branch line motor, which switch is controlled in like manner to that of the main line conveyer. The limit switch 18 of the main line conveyer and the limit switch 20 of the branch line conveyer are arranged in multiple in the control circuit 19 of the branch line motor and are both normally closed. The branch line control circuit 19 contains an electromagnet or solenoid 21 whose armature constitutes a switch 22 in the power circuit 23 of said branch line motor 5. By this arrangement, the opening of either one of said limit switches does not break the control circuit of the branch line motor, whereas the simultaneous opening of the two limit switches does break said circuit. Consequently, passage of an article through either gate-way does not disturb the operation of the system; but if an article on either line reaches its gate-way while the gate-way of the other line is open, both limit switches are opened and the control circuit of the branch line motor is broken and the power thereby shut off from the branch line and remains shut off until the article on the main line conveyer has passed through its gate-way and permitted the same to close.

Figure 4:
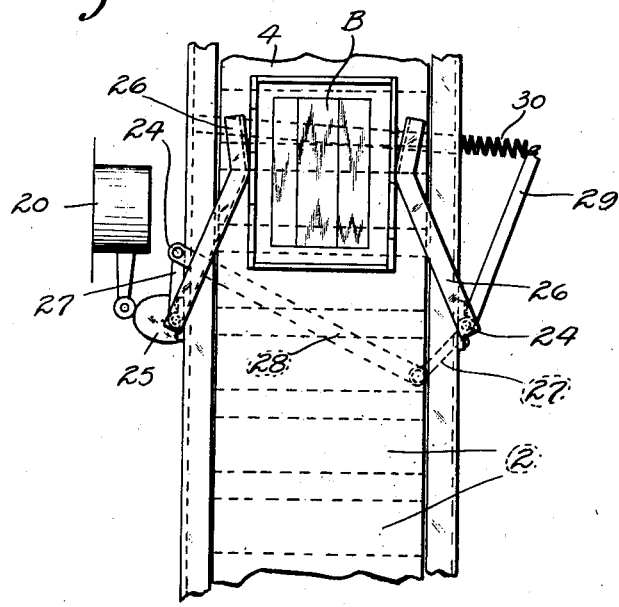
Fig. 4 is an enlarged plan view of the gate-way portion of a branch line.

The gate-way of the branch line may be the same as the gate-way of the main line hereinbefore described; but a simpler form may be suitable for the branch line. As shown in Figure 4, the branch line mechanism comprises two oppositely disposed vertical rock shafts 24, one of which is provided with a cam 25 that cooperates with a limit switch 20 as hereinbefore described in connection with the main line mechanism. The two rock shafts are disposed on opposite sides of the branch line and are provided with elongated gate members 26 which are inclined forwardly and inwardly and whose end portions are bent so as, in their normal closed position, to lie parallel with each other but at a distance apart less than the width of the articles B handled on said branch line conveyer. Each of the two shafts is provided with an arm 27 and the two arms are pivotally connected together by a cross-link 28 as hereinbefore described in connection with the main line mechanism. Also as described in connection with the main line mechanism, one of said rock shafts has an arm 29 that is provided with a helical spring 30 suitably connected to the framework for the purpose of yieldably holding the parts in their normally closed position. The operation of this branch line gate-way mechanism is similar to that of the main line gate-way mechanism.

The operation of the system hereinbefore described is as follows:

Normally both the main line conveyer and the branch line conveyer are running simultaneously. When an article A on the main line conveyer reaches the gate-way mechanism, which is normally closed, it presses against the inclined end of one or both of the gate-way bars and thereby spreads said bars apart far enough to pass between them, one or both of said bars meanwhile pressing against the side of the article due to the tension of the helical spring, which restores said gate-way bars to their closed position as soon as the article passes them. This operation of opening and closing the gate-way of the main line opens and closes the main line limit switch 18 of the circuit of the branch line dynamo, as hereinbefore explained; but on account of said limit switch 18 being in parallel with the limit switch 20 of the branch line, the opening of one of said limit switches without the other has no effect on the branch line motor. When, however, an article on the branch line conveyer operates the gate-way thereof, (and consequently the limit switch thereof) while an article is passing through the main line gate-way, the circuit 23 of the branch line motor is broken at the control switch 22 with the result that the branch line conveyer is stopped and the article B thereon held at the gate-way mechanism. As soon as the article on the main line conveyer passes through its gate-way, the helical spring 15 restores the gate-way mechanism to its initial position, thereby closing the circuit 19 of the branch line motor through the limit switch of the main line mechanism, whereupon the branch line conveyer is started up and carries the article thereon through its gate-way and delivers it onto the gravity conveyer section and thence to the main line conveyer.

From the foregoing description of my system and its operation, it is obvious that the gate-way mechanisms of the branch line (or lines) and of the main line should be located a short distance rearwardly from their point or points of junction, the proper distance being readily ascertainable by reference to the time of travel of the articles on the main and branch lines from their respective gate-ways to the point or points of junction.

Obviously, the construction hereinbefore described admits of considerable variation without departing from my invention as I believe I am the first to devise a power conveyer system wherein the operation of a branch line is controlled by articles on the main line. For instance, not only can any suitable type of electric motor be substituted for the types illustrated in the drawing, but such electric motors may be replaced with engines of other types, such as steam engines or internal combustion engines. In the case of a steam engine (or engines) or internal combustion motor (or motors), the power device of the branch line is rendered inoperative to transmit power by any suitable form of clutch arranged to respond to the control circuit after the manner hereinbefore described with reference to the control switch 22. Accordingly, the term "source of power" is intended to include such steam engines and internal combustion engines as well as electric motors; and electric motors are regarded as independent sources of power even though they may be connected to the same generator.

What I claim is:

1. A power conveyer system comprising a plurality of lines and means operable conjointly by articles on said lines for controlling the operation of one of said lines.

2. A power conveyer system comprising a main line and a branch line, and means operable conjointly by articles on the main and branch lines for controlling the operation of said branch line.

3. A power conveyer system comprising a main line and a source of power therefor, a branch line and a separate source of power therefor, and means operable conjointly by articles on the main and branch lines for controlling the operation of said branch line.

4. A power conveyer system comprising a main line, a branch line, a device operatively located with reference to the main line to be actuated by an article thereon, and a device operatively located with reference to the branch line to be actuated by an article thereon, said devices being adapted, by conjoint action, to control the operation of said branch line.

5. In a power conveyer system, a control device comprising vertically disposed rock shafts on opposite sides of the conveyer and having arms extending transversely of said conveyer to be actuated by an article on said conveyer, said rock shafts having arms extending in opposite directions and connected by a coil spring for yieldingly holding said first mentioned arms in normal position, one of said shafts having a cam, and a limit switch in a power control circuit in position to be actuated by said cam.

6. A power conveyer comprising a main line having a source of power, a branch line having a separate source of power, a curved gravity conveyer interposed between said main line and branch line, a limit switch operable by articles traveling on the main line, a separate limit switch operable by articles traveling on the branch line, and an electric circuit controlling the power of the branch line, said limit switches being arranged in parallel in said circuit and being normally closed.

7. In a power conveyer, a control device comprising vertically disposed rock shafts on opposite side of the conveyer having arms extending transversely of said conveyer to be actuated by an article on said conveyer, said rock shafts having arms extending in opposite direction and connected by a spring, and a limit switch in a power control circuit in position to be actuated by said rock shafts.

8. A power conveyer comprising a main line having a source of power, a branch line, an electric circuit containing a motor for said branch line and a control switch in said circuit, and a gravity conveyer interposed between said main line and branch line, a second electric circuit containing a limit switch operable by articles traveling on the main line and a separate limit switch in parallel with said first mentioned limit switch operable by articles traveling on the branch line, and means for actuating said control switch.

9. A power conveyer system comprising a main line having a source of power and a branch line having an independent source of power and electromagnetic means for controlling the latter, a switch operatively located with reference to the main line to be actuated by an article thereon, and a switch operatively located with reference to the branch line to be actuated by an article thereon, said switches being in parallel in the circuit of said controlling means whereby they are adapted, by their conjoint action to control the operation of said branch line.

10. A power conveyer system comprising a main line having a source of power and a branch line having an independent source of power and electromagnetic means for controlling the latter, a normally closed switch operatively located with reference to the main line to be opened by an article thereon, and a normally closed switch operatively located with reference to the branch line to be opened by an article thereon, said switches being in parallel in the circuit of said controlling means whereby they are adapted by their simultaneous opening to break the circuit of said controlling means and bring about the operation thereof.

Signed at St. Louis, Missouri this 3rd day of January, 1925.

ALEXANDER S. LANGSDORF.